United States Patent [19]
Brouwer

[11] Patent Number: 5,823,054
[45] Date of Patent: Oct. 20, 1998

[54] MOVEMENT ACTUATOR

[75] Inventor: Stefan Frits Brouwer, Den Haag, Netherlands

[73] Assignee: IKU Holding Montfoort B.V., Montfoort, Netherlands

[21] Appl. No.: 687,375

[22] PCT Filed: Feb. 2, 1995

[86] PCT No.: PCT/NL95/00049

§ 371 Date: Nov. 12, 1996

§ 102(e) Date: Nov. 12, 1996

[87] PCT Pub. No.: WO95/21339

PCT Pub. Date: Aug. 10, 1995

[30] Foreign Application Priority Data

Feb. 2, 1994 [NL] Netherlands ............ 9400163

[51] Int. Cl.$^6$ ............... B60R 1/02; G02B 7/182
[52] U.S. Cl. ............ 74/425; 74/606 R; 248/479; 248/549; 248/900; 359/872
[58] Field of Search ............ 74/427, 425, 89.14; 359/872, 876, 877; 248/479, 549, 900

[56] References Cited

U.S. PATENT DOCUMENTS

| | | | |
|---|---|---|---|
| 1,405,359 | 1/1922 | Troupe | 74/427 |
| 1,594,987 | 8/1926 | Adams | 74/425 |
| 1,751,650 | 3/1930 | Nieman | 74/425 |
| 4,982,926 | 1/1991 | Mori et al. | 248/479 |
| 5,080,492 | 1/1992 | Platzer, Jr. | 359/877 |
| 5,384,660 | 1/1995 | Oishi | 359/877 X |
| 5,432,641 | 7/1995 | Mochizuki | 359/872 X |
| 5,467,230 | 11/1995 | Boddy et al. | 359/874 |

FOREIGN PATENT DOCUMENTS

| | | |
|---|---|---|
| 100810 | 2/1984 | European Pat. Off. . |
| 8902300 | 4/1991 | Netherlands . |

*Primary Examiner*—Rodney H. Bonck
*Assistant Examiner*—Troy Grabow
*Attorney, Agent, or Firm*—Wenderoth, Lind & Ponack, LLP

[57] ABSTRACT

A movement actuator includes first and second modules that are constructed to fit together in different manners. The first module includes first and second actuator parts mounted for rotation relative to one another, a gear wheel rotatable arranged in the second actuator part, and a transmission system including a coupler coupled to the gear wheel and a worm wheel. The second module includes a motor housing and an electromotor mounted in the housing and having a drive shaft having mounted thereon a worm. When the two modules are coupled together, in any of the different manners, the worm engages the worm wheel, thereby coupling the electromotor through the transmission system and gear wheel to the actuator parts. As a result, the electromotor is operable to rotate the actuator parts relative to each other.

18 Claims, 6 Drawing Sheets

MOVEMENT ACTUATOR

BACKGROUND OF THE INVENTION

The invention relates to a movement actuator including first and second actuator parts that are rotatably mounted relative to one another, and an electromotor and a transmission system coupled between the electromotor and the two actuator parts for rotating the actuator parts relative to one another.

Such an actuator is known, for instance from Dutch patent application 89.02300. This known actuator is intended to be mounted in the interior of a mirror housing/support combination of a rear-view mirror to be secured to the side of a vehicle. In appearance, the mirror housing/support combination forms one whole, with the mirror support secured to the vehicle, and the mirror housing, with the rear-view mirror arranged therein, being pivotable relative to the mirror support. In the operational position of the mirror housing, wherein the mirror surface makes an angle of almost 90° with the side of the vehicle, a driver of the vehicle is capable of viewing the road section located alongside and behind the vehicle by means of the mirror. The mirror housing projects with respect to the side of the vehicle, and the above-mentioned pivotal movement offers the possibility of folding the mirror housing into a rearwardly folded position, if desired, so as to remove or at least reduce this projection, thereby reducing the total width of the combination of the vehicle and the mirror housing, which offers advantages, for instance when the vehicle is parked where there is only little parking space, or to prevent damage caused by passing vehicles or pedestrians, because in the event of a collision, the mirror housing will yield rather than break off. As a matter of fact, for reasons of safety, in many countries it is required by law that vehicle mirrors be pivotable relative to the vehicle in question.

When the vehicle is provided with a mirror folding-in mechanism as described hereinabove, which will generally be the case with the more luxurious vehicles, this folding-in cannot only be performed by hand, but the driver is moreover given the possibility of folding in the mirror housing from his seat by operating the electromotor.

In order to be able to effect the above, the transmission system should have a fairly great transmission ratio, allowing a relatively small motor, which can then be driven at a fairly high speed, to produce a fairly great couple. Further, the transmission system should resist rotation resulting from a couple exerted on the output. For this purpose, the system disclosed in the above-mentioned publication has a planetary gear reduction system having a transmission ratio of 3,000, having an input gear wheel mounted on the output shaft of the motor, the rotation axis of the motor being in alignment with the pivot axis of the actuator. Such a planetary gear reduction system has a relatively large number of parts and occupies substantial space. In addition, this planetary gear reduction system has a fairly long, solid output shaft, in alignment with the motor. Hence, the known system has a fairly great axial length, which renders it difficult to use the known system in a mirror housing of limited inside space.

A further drawback of the known system is that electric conductors, such as those intended for controlling the motor, have to extend outside the actuator. On the one hand, this is a drawback when it is used in a mirror housing of limited inside space, on the other hand this is a drawback with respect to the pivotal movement of the housing relative to the vehicle.

A movement actuator as descibed in U.S. Pat. No. 1,594,987 is intended for use in the interior of a hoist mechanism. In this known construction, a worm wheel has a smaller diameter than worms, and the worms have a relatively great diameter and are in direct mesh with a gear wheel to be driven. This involves various drawbacks.

The relatively small diameter of the worm wheel results in a relatively small transmission ratio. To be able to produce a specific force (couple) all the same, the motor that is used should be relatively powerful, which means that the motor is relatively large and expensive. Further, the worm wheel will be relatively heavily loaded, as a consequence of which it will be subject to wear.

The relatively great diameter of the worms results in relatively considerable friction losses, or a reduced yield of the transmission system. In order to compensate for this, the motor should be relatively powerful again. Further, relatively much noise is produced by this construction.

The above-mentioned drawbacks provide that this known construction is unsuitable for being used in situations where the space available is small, and where it is desired to render the mechanism as compact, noiseless and cheap as possible.

SUMMARY OF THE INVENTION

A general object of the invention is to improve the known movement actuator.

A first specific object of the invention is to save on the manufacturing costs of the movement actuator.

A second specific object of the invention is to provide a construction for the movement actuator such that it is stronger and can hence be manufactured from smaller parts and/or cheaper materials. More particularly, the object of the invention is to provide a particularly compact transmission system having a great transmission ratio.

A third specific object of the invention is to provide a construction for the movement actuator such that is has fewer moving parts and can hence be manufactured more cheaply and is less subject to wear.

A fourth specific object of the invention is to provide a construction for the movement actuator such that the outside dimensions thereof are reduced without sacrificing strength. It will be clear that when used as a pivoting mechanism for a vehicle mirror, the outside dimensions of the movement actuator should be such that the movement actuator can be arranged in the housing of the wing mirror of a vehicle. It is a fact that the shape and dimensions of such a housing are determined by the manufacturer of the relevant vehicle and can therefore be regarded as a prior condition, while, because the shape and dimensions of such a housing are always adjusted to the shape of She relevant vehicle, the shape and the dimensions of the space available in the housing for the movement actuator are different for mutually different vehicle types. For this reason, heretofore, a movement actuator had to be designed for every vehicle (mirror housing) for which that movement actuator was intended. In practice, this makes a movement actuator relatively expensive, because development costs have to be made per type of movement actuator, a manufacturing line has to be set up per type of movement actuator, and storage space has to be reserved per type of movement actuator for loose parts and finished products. The object of the invention is to solve this problem or at least reduce it by constructing the movement actuator such that it is suitable for modular construction, in such a manner that the modular parts can be connected to each other in at least two essentially different manners to provide a finished product that has either relatively slight vertical dimensions or relatively slight horizontal dimensions.

A further specific object of the invention is to provide a construction for the movement actuator such that is can be used without modifications for both a right mirror and a left mirror. This yields a further cost saving in the production and storage of movement actuators, because the manufacturer need not distinguish between the two types.

A yet further specific object of the invention is to provide a movement actuator which is hollow near its pivot axis, so that there is room at the pivot axis for passing electric conducting wires therethrough.

More in particular, the object of the invention is to realize the above-mentioned objectives in one movement actuator.

BRIEF DESCRIPTION OF THE DRAWINGS

Further aspects, characteristics and advantages of the invention will be explained in the following description of preferred embodiments of the movement actuator according to the invention, with reference to the accompanying drawings. In these drawings.

DETAILED DESCRIPTION OF THE INVENTION

Because its use as a pivoting mechanism in a vehicle mirror is an important application of the movement actuator, the movement actuator according to the invention will hereinbelow be described with specific reference to that field of application. However, it is explicitly observed that the application of the movement actuator according to the invention is not limited to this field of application, but that it can also be used in other situations where a movement actuator is required but where requirements are set with regard to dimensions and shape. Examples of such alternative applications are: electric height adjustment apparatus for headlights of motorcars; electric adjustment apparatus for tilting shutters for windows.

Figure 1:
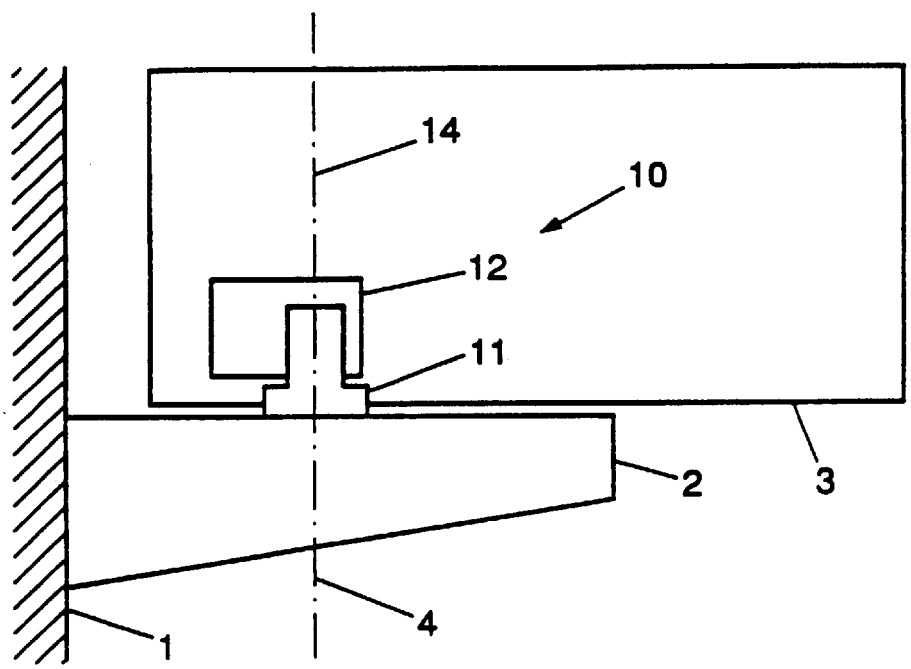
FIG. 1 schematically shows a front view of a vehicle with a wing mirror.

FIG. 1 schematically shows a front view of a sidewall of a vehicle 1 to which a substantially horizontally extending support 2 is attached. Attached to the support 2 is a mirror housing 3, pivotable about a pivot axis 4 that extends substantially vertically.

Further, in FIG. 1 it is schematically indicated that in the mirror housing 3 a movement actuator 10 is arranged, a first actuator part 11 of which is attached to the support 2 and a second actuator part 12 of which is attached to the mirror housing 3. The actuator parts 11 and 12 are rotatable relative to one another about a rotation axis 14 which, when the mirror housing 3 with the movement actuator 10 is mounted on the support 2, is aligned with the pivot axis 4. The movement actuator 10 further comprises an electromotor and a transmission system, not shown in FIG. 1 for simplicity's sake. The transmission system is coupled to the actuator parts 11 and 12 such that when the electromotor is excited, the actuator parts 11 and 12 are rotated relative to one another so as to cause the mirror housing 3 to pivot relative to the vehicle 1 in a direction determined by the direction of rotation of a driven shaft of the electromotor.

Figure 2A:
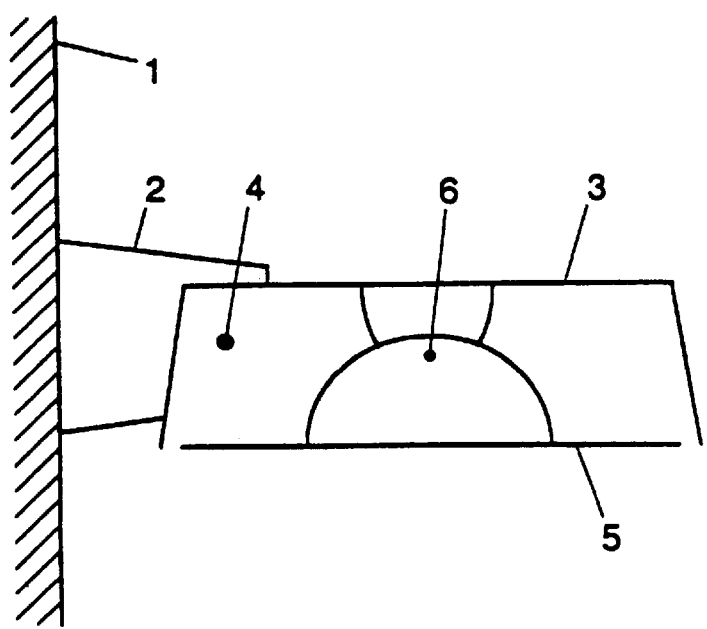
FIGS. 2A–2C schematically shows a top plan view of a vehicle with a wing mirror in an operational position (FIG. 2A), a rearwardly folded position (FIG. 2B), and a forwardly folded position (FIG. 2C)
Figure 2B:
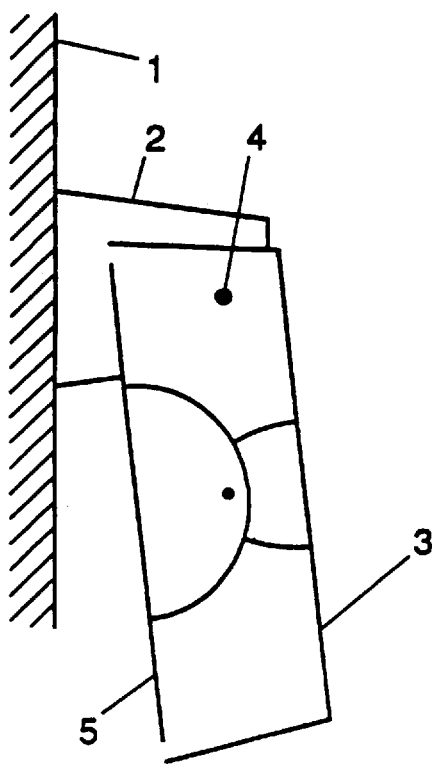
Figure 2C:
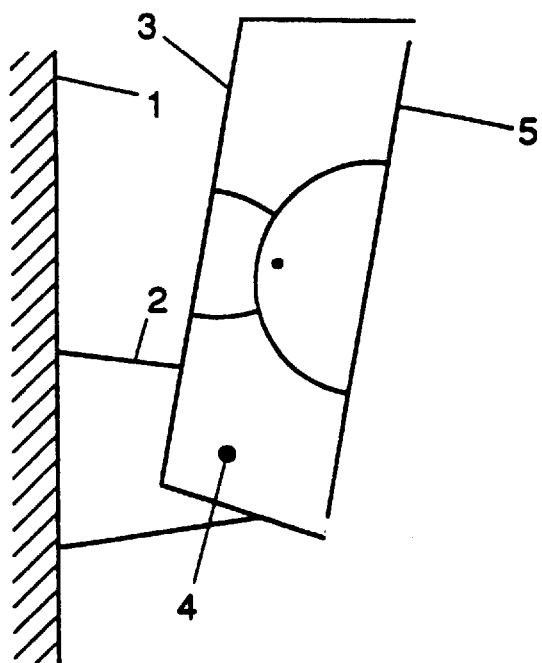

FIG. 2A–2C are schematic top plan views of the vehicle 1 with the mirror housing 3. During normal use, the mirror housing 3 is in an operational position (FIG. 2A), wherein a mirror face 5, arranged in the mirror housing 3 for pivoting about a shaft 6, extends substantially perpendicularly relative to the sidewall of the vehicle 1. Optionally, for instance for protection in a parking place, the mirror housing 3 can be moved into a rearwardly folded position (FIG. 2B) through a rearward pivotal movement about the pivot axis 4, with the mirror face 5 facing the vehicle 1. It is also possible to move the mirror housing 3 into a forwardly folded position (FIG. 2C) through a forward pivotal movement about the pivot axis 4, with the mirror face 5 facing away from the vehicle 1; commonly, this last-mentioned option will not be intentionally chosen by the user but caused accidentally, for instance by a pedestrian walking past.

For defining the rearwardly folded position and the forwardly folded position, stops can be formed on the support 2 and the mirror housing 3, as is known per se. Such stops can also be formed on the actuator parts 11 and 12. The main function of these stops is preventing the mirror housing 3 from touching the vehicle 1.

Figure 3A:
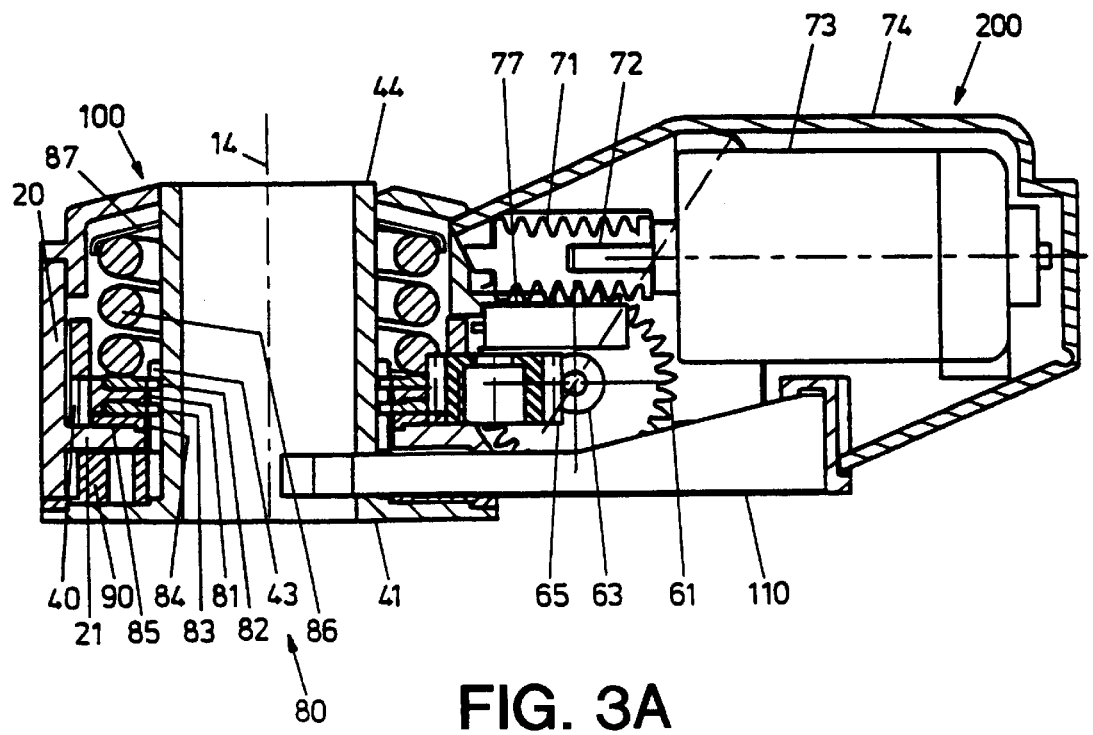
FIGS. 3A and 3B show side elevations, partly in section, of an embodiment of a movement actuator according to the invention, in two different structural variants.
Figure 3B:
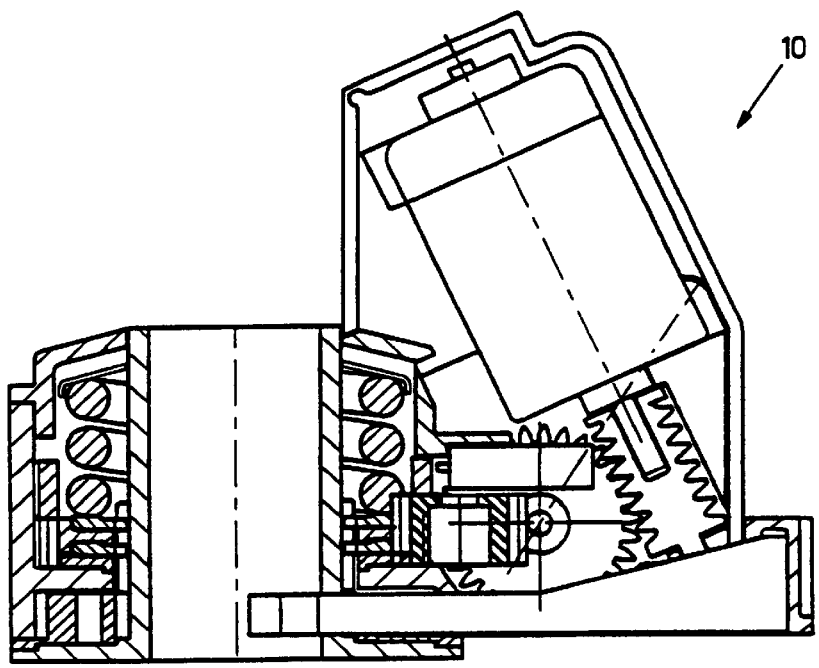
Figure 4:
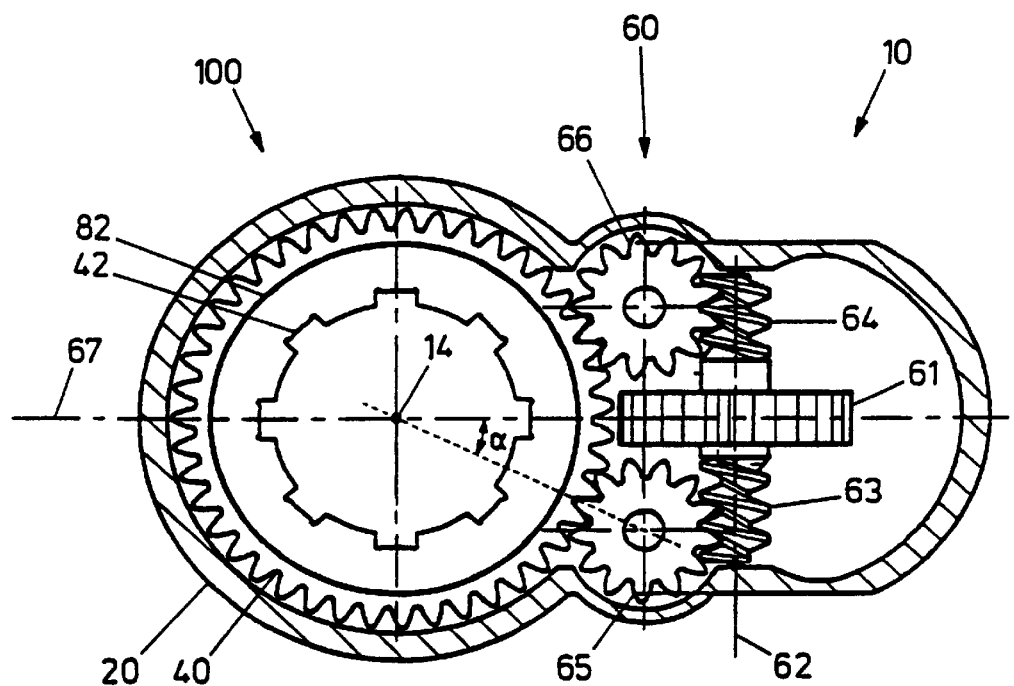
FIG. 4 shows a top plan view, partly in section, of the movement actuator shown in FIGS. 3A and 3B.

FIG. 3A and 3B show side elevations, partly in section, of an embodiment of the movement actuator 10 according to the invention. FIG. 4 shows a top plan view, partly in section, of the movement actuator show in FIG. 3A and 3B.

The movement actuator 10 according to the invention as shown comprises a housing 20 and a gear wheel 40 capable of rotating in the housing 20 about the axis 14. The gear wheel is coupled, in a manner which will be described in more detail hereinbelow, to a base 41 intended to be mounted on the support 2 of a vehicle, for instance by means of screws or any other means known per se, for which purpose the base 41 may be provided with holes, not shown for simplicity's sake, corresponding to the tapped holes provided in the support 2. Likewise, the housing 20 is intended to be attached to the mirror housing 3, for instance also by means of screws or any other means known per se, for which purpose the housing 20 may also be provided with holes, not shown for simplicity's sake, corresponding to tapped holes provided in the mirror housing 3.

Bearing-mounted in the housing 20 is a transmission system 60. In accordance with an important aspect of the invention, the transmission system 60 comprises a worm wheel 61, bearing-mounted in the housing 20 for rotation about a rotation axis 62, and a first worm 63 and a second worm 64 which are attached, concentrically with the rotation axis 62, to the worm wheel 61, on both sides thereof. In a preferred embodiment, the worm wheel 61 and the two worms 63 and 64 are manufactured as one whole.

In the embodiment shown in FIG. 4, the combination of the worm wheel 61 and the two worms 63 and 64 is bearing-mounted at the ends of the two worms 63 and 64 remote from the worm wheel 61, in the housing 20, with the rotation axis 62 extending substantially horizontally, i.e. substantially perpendicularly relative to the rotation axis 14.

The first worm 63 is coupled to the gear wheel 40 via a first intermediate gear wheel 65, and the second worm 64 is coupled to the gear wheel 40 via a second intermediate gear wheel 66, which intermediate gear wheels 65, 66 form couplers and are also bearing-mounted in the housing 20.

As is clearly shown in the drawings, the diameter of the worm wheel 61 is greater than the diameters of the worms 63, 64, and the diameter of the gear wheel 40 is greater than the diameters of the intermediate gear wheels 65, 66. Further, in the embodiment shown, the diameters of the two worms 63, 64 are identical.

In the transmission system 66, the worm wheel 61 functions an input. When the worm wheel 61 is driven by a worm, as will be described in more detail hereinafter, the worms 63, 64 attached thereto drive the intermediate gear wheels 65, 66 respectively, which, in turn, drive the gear wheel 40, which is thus urged to rotate relative to the housing 20. Accordingly, the base 41 coupled to the gear wheel 40 is also urged to rotate relative to the housing 20. It will be understood that as a result, when the movement actuator is mounted on a vehicle 1 and a mirror housing 3, such mirror housing 3 is urged to pivot relative to the vehicle 1.

Thus, the transfer of the driving force from the worm wheel 61 to the gear wheel 40 takes place in a parallel manner via two transfer paths, a first transfer path extending via the first worm 63 and the first intermediate gear wheel 65, and a second transfer path extending via the second worm 64 and the second intermediate gear wheel 66. Consequently, these parts are loaded with only half the driving force, while the separate teeth of the gear wheel 40 are also less loaded than in the case where that gear wheel 40 would be driven via a single transfer path. This renders it possible that the driving force to be transferred is greater, and/or that the parts are manufactured from a less strong material such as synthetic material, and/or that these parts can be relatively small, as a result of which the total size of the actuator 10 can be relatively small.

Although this is not required, the intermediate gear wheels 65, 66 in the example shown are identical, and (as far as their positions are concerned) symmetrically arranged on both sides of a symmetrical plane 67 of the worm wheel 61, in which plane the rotation axis 14 extends as well. The rotation axes of the intermediate gear wheels 65, 66 are parallel to the rotation axis 14.

As appears in particular from FIG. 4, the dimensions of the actuator 10 are relatively slight, due to the particularly compact construction of the transmission system 60. In this connection, various variations are conceivable, each having a particular impact on the degree of compactness that is obtained. For the following discussion of such variations, the angle that is included by the plane 67 and a plane defined by the rotation axis 14 and the rotation axis of the intermediate gear wheel 65 will be designated by the symbol $\alpha$.

The width of the actuator 10 can be decreased by reducing the diameter of the gear wheel 40. However, when this is accompanied by a reduction of the number of teeth of the gear wheel 40, this results in a reduced gear ratio. Because the width of the actuator 10 is also determined by the intermediate gear wheels 65, 66, the angle $\alpha$ and/or the diameter of the intermediate gear wheels 65, 66 would have to be reduced as well. The reduction of the angle $\alpha$ has as a result that the thickness of the worm wheel 61 should be chosen to be smaller, which implies a weakening of the worm wheel 61. The reduction of the diameter of the intermediate gear wheels 65, 66 implies that the center-to-center distance from the worm wheel 61 to the gear wheel 40 can be reduced and the diameter of the worm wheel 61 can be reduced, which results in a decreased length of the actuator 10. However, a decreased diameter of the worm wheel 61 results in a reduction of the number of teeth of the gear wheel 61, which again implies a reduced gear ratio.

Because the worms 63 and 64 are in line, it is possible in an embodiment to manufacture the combination of the worms 63 and 64 and the worm wheel 61 by fastening a through worm centrally in the worm wheel 61, for instance through welding or glueing, the parts of that through worm which project on both sides from the worm wheel 61 forming the worms 63 and 64. However, it will be understood that the pitch of the worms 63, 64 is only needed where they are in mesh with the intermediate gear wheels 65 and 66, so that it is also possible to start from a bar in which a worm pitch is cut at two locations in lieu of a through worm, as a result of which the bar has no worm pitch at the location of the worm wheel 61, as shown in FIG. 4. Accordingly, it is also possible to provide the worm pitch only after the bar has been attached to the worm wheel. As a variant, it is possible to start from a worm wheel of relatively great thickness and to turn it down to bar thickness, and to subsequently cut the worm pitch so that the combination of the worms 63 and 64 and the worm wheel 61 are manufactured in one piece. It is also possible to manufacture that combination as a single injection-molded piece or cast piece, or to start from the worms 63, 64 and injection-mold a plastic worm wheel 61 around them.

With regard to the last-mentioned manufacturing possibilities, it is possible to cause the worms 63 and 64 to be twisted relative to one another through a given torsion angle $\beta$, which is equivalent to a given axial displacement of the worms 63 and 64 relative to one another. This yields a greater flexibility in designing the transmission system 60 as it introduces an extra degree of freedom, enabling in each case the combination of the worms 63 and 64 and the worm wheel 61 to be adapted to the positions of the intermediate gear wheels 65 and 66.

The embodiment shown in the drawings the following parameters:
gear wheel 40: tip diameter$\approx$31.53 mm
 number of teeth=50
gear wheel 65: tip diameter$\approx$11.04 mm
 number of teeth=16
 angle $\alpha \approx 23.10°$
gear wheel 66: identical to gear wheel 65 worm wheel 61:
 tip diameter$\approx$18.61 mm
 number of teeth=35
worm 63: tip diameter$\approx$5.04 mm
 pitch (single)$\approx 9°$
worm 64: identical to worm 63
 torsion angle $\beta$: 0°

The worm wheel 61 is driven by a worm 71 which may be mounted directly on the driven shaft 72 of an electromotor 73. In principle, the orientation of the electromotor 73 with the worm 71 can further be varied. FIGS. 3A and 3B show two possible variants. In the configuration shown in FIG. 3A, the shaft 72 of the motor 73 is directed at least substantially perpendicularly to the rotation axis 14, with the worm 71 located above the worm wheel 61. In this configuration, the movement actuator has a very slight vertical dimension. In the configuration shown in FIG. 3B, the shaft 72 of the motor 73 makes a fairly acute angle with the rotation axis 14, with the worm 71 located on the side of the worm wheel 61 facing away from the axis 14. This acute angle is chosen such that the motor 73 does not project beyond the worm 71 in a horizontal direction. In this configuration, the movement actuator has a very slight horizontal dimension.

In the embodiments shown in FIG. 3, the shaft 72 of the motor 73 is always in the plane 67 of the worm wheel 61, i.e., a plane perpendicular to the rotation axis 62 of the worm wheel 61. In this connection, the teeth of the worm wheel 61 are commonly inclined relative to plane 67 and are at an angle adapted to the pitch of the worm 71. In a variant of the movement actuator according to the invention, the motor 73 is placed obliquely relative to plane 67 of the worm wheel 61, i.e. the shaft 72 of the motor 73 makes an angle with plane 67, which angle is preferably adapted to the pitch of the worm 71 such that the teeth of the worm wheel 61 can be perpendicular to plane 67. In that case, the worm wheel 61 can be manufactured more simply and hence more cheaply without requiring the other parts to be adapted, which advantage is particularly apparent when the worm wheel 61 is manufactured through injection molding.

In accordance with an important aspect of the present invention, the movement actuator shown in FIGS. 3A–3B is of modular construction. A first module 100 comprises the combination of the housing 20, the base 41 and the transmission chain 60, and a second module 200 comprises the motor 73 with the worm 71 mounted on the driven shaft 72 thereof, and a motor housing 74, wherein the motor 73 is mounted and which can be attached to the housing 20. The shapes of the housing 20 and the motor housing 74 are matched to fit together in two manners, as illustrated in FIGS. 3A and 3B The housing 20 and the motor housing 74 can be attached to each other in a manner known per se by means of for instance screwing or glueing, but preferably, this attachment is carried out by means of snap elements.

This has enabled a manufacturer to produce with the same components a movement actuator that fits in mirror housings of slight vertical space and in mirror housings of slight horizontal space. This manufacturer can promptly react to a possible demand for one of the two variants by stocking the finished modules, which are formed into a finished actuator merely by attaching the modules to each other.

As mentioned hereinabove, stops can be present for defining the rearwardly folded position and the forwardly folded position. When a pivotal movement is carried out under the influence of the electromotor (pivoting electrically), it is desired that the motor is stopped when those extreme positions are reached. For this purpose, the movement actuator can be provided with switches 77, as is known per se, arranged inside the housing 20. An additional advantage of the construction according to the invention is that the arrangement of such switches does not require any extra space, because those switches can be arranged on both sides of the worm wheel 61, above the worms 63, 64 and the intermediate gear wheels 65, 66, as illustrated in FIGS. 3A and 3B. As is illustrated in FIGS. 3A and 3B, the gear wheel 40 is preferably not directly connected with the base 41, but a friction coupling is included between the gear wheel 40 and the base 41. In the embodiment shown, this friction coupling 80, belonging to the first module 100, comprises an annular plate 81, formed on the gear wheel 40 and fitting with a certain interspace around a cylinder 44 that extends upward from the base 41. This cylinder 44, preferably manufactured in one piece with the base 41, is hollow in order that conductors (not shown) for exciting the motor can be arranged through it. Extending along the outer wall of the cylinder 44 are axial fingers 43 that are positionally fixed relative to the cylinder 44 and have the function of cams. Disposed above and under annular plate 81 are a first annular friction plate 82 and a second annular friction plate 83 respectively, which friction plates, at their inside circumferences, are provided with keyways 42 that are in mesh with the fingers 43. Under the second (lower) friction plate 83, a third friction-plate 84 is located, clear of the fingers 43 but coupled in a rotational sense to the gear wheel 40 via coupling elements. These coupling elements can be any suitable coupling elements. By way of example, these coupling elements can be formed by a system of mutually enmeshing, radially directed projections and recesses on the third friction plate 84 and the gear wheel 40 respectively, as shown in FIG. 3A at 85.

The third friction plate 84 rests against an annular supporting wall 21 of the housing 20. This supporting wall 21 in turn rests against the base 41, with the interposition of a cam disc 90, coupled in a rotational sense to the base 41 via coupling elements. These coupling elements, too, can be mutual projections and recesses, as will be understood by anyone skilled in the art. This cam disc 90 functions as a fourth friction plate between the housing 20 and the base 41.

It is observed that the base 41, the fingers 43 and the cam disc 90 can be formed as one whole. However, in the embodiment shown, the fingers 43 and the cam disc 90 are formed as a separate whole, loose from the base 41. This allows the cam disc 90 to be manufactured from a material different from that of the base 41, more particularly from plastic, which offers advantages in respect of another function of the cam disc 90, to be discussed later on. In that case, manufacturing fingers 43 that extend upward from the cam disc 90 in one piece with that cam disc 90 is simpler and cheaper than forming the fingers 43 on the cylinder 44.

The friction plates 82, 81, 83 and 84 are pressed together and against the supporting wall 21 by an end portion of a compression spring 86, which, at its other end portion, bears against a diaphragm spring or check spring 87, which in turn engages the cylinder 44. The compression spring 86 is constructed as a helical spring and is arranged so as to be coaxial to the cylinder 44. By virtue of this construction, the outside dimensions of the housing 20 are only slightly greater than those of the gear wheel 40, while the space required for passing through the above-mentioned conductors, i.e. the inside diameter of the cylinder 44, is relatively slightly less than the dimensions of the gear wheel 40: Compared with the prior art, the effect thus achieved is that in spite of the reduced outside dimension of the actuator 10, the pass-through space of the cylinder 44 is enlarged, allowing more conductors to be passed through it, as is for instance desired for exciting a heating element for the mirror.

Due to the compressive force of the compression spring 86, the housing 20 and the base 41 are held together as well, with the supporting wall 21 of the housing 20 being pressed against the cam disc 90 functioning as a fourth friction plate. This compression force is determined, when the compression spring 86 and the diaphragm spring 87 are mounted, by the distance through which the diaphragm spring 87 is slid along the cylinder 44 while compressing the compression spring 86. For this purpose, a certain mounting force is exerted on the diaphragm spring 87, downwardly directed parallel to the axis 14 in FIGS. 3A and 3B. The compression force exerted by the compression spring 86 is equal to the mounting force. When the mounting force is removed, the diaphragm spring 87 grips firmly around the cylinder 44, causing the compression spring 86 to keep exerting its thus set compression force on the friction coupling 80. The equilibrium of forces follows a closed path formed by the cylinder 44, the diaphragm spring 87, the compression spring 86, the friction plates 82, 81, 83, 84, the supporting wall 21, the cam disc 90, and the base 41, the base 41 forming a functional whole with the cylinder 44.

An important purpose of the friction coupling 80 is to prevent the transmission system 60 from being damaged when an external force is applied to the mirror housing 3, for instance due to a pedestrian walking against it, but also to enable manual pivoting. The operation of the friction coupling 80 is as follows.

At rest, such as in the operational position, the housing 20 is coupled to the base 41 via the cam disc 90. It is thus provided that external forces, such as wind load, applied to a mirror housing 3 are directly passed to the support 2 without loading the transmission system 60. It is also provided that play, if any, in the transmission system 60 does not influence the stability of the mirror housing 3, because this direct coupling effects that the housing 20 and accordingly the mirror housing 3 are connected free from vibration to the base 41 and accordingly the support 2 of the vehicle 1.

A suitable maximum friction value for the fourth friction plate (cam disc 90) is 2 Nm.

Further, the housing 20 is connected with the base 41 via the friction plates 81–84, the fingers 43 and the cam disc 90.

Only if an external force applied to the mirror housing is more than the sum of the maximum friction value of the fourth friction plate 90 and the maximum friction value of the friction plates 81–84, for instance because the user wants to adjust the mirror housing 3 by hand, can the housing 20 and accordingly the mirror housing 3 pivot relative to the base 41 and accordingly the support 2 of the vehicle 1. Because the motor is not excited, the mirror housing 3, the housing 20, the gear wheel 40, the transmission system 60 and the motor 73 can be regarded as a whole, and the above-mentioned pivotal movement will involve rotation of the friction plate 81 of the gearwheel 40 relative to the friction plates 82, 83 coupled to the base 41 aria the fingers 43. The load applied to the transmission system 60 will never exceed the maximum friction value of the friction plates 81–84, which hence means a protection of the transmission system 60. A suitable maximum friction value for these friction plates 81–84 is 4 Nm.

When it is desired that the mirror housing 3 be pivoted electrically, the motor is excited, as a result of which the gear wheel 40 is urged to rotate relative to the housing 20, as is described more elaborately hereinabove. This is of course equivalent to a forced rotation of the housing 20, and accordingly the mirror housing 3, relative to the gear wheel 40, which is now held in a fixed position by the friction plates 81–84 relative to the fingers 43 of the base 41, and accordingly to the support 2 of the vehicle 1. Because the housing 20 and the base 41 rotate relative to one another, the maximum friction value of the fourth friction plate 90 must now be overcome.

It is thus provided that in the operational position, the mirror housing 3 is mounted relative to the vehicle so as to be largely free from vibration, and that pivoting the mirror housing 3 from the operational position by hand requires relatively much force, whereas pivoting the mirror housing 3 electrically requires relatively little force. In other words, the actuator 10 need not overcome the entire "retaining force", as a result of which the parts of the actuator 10, in particular the parts of the transmission system 60, can be relatively small and can be manufactured from synthetic material, which implies a cost reduction and enables a more noiseless operation.

Figure 5:
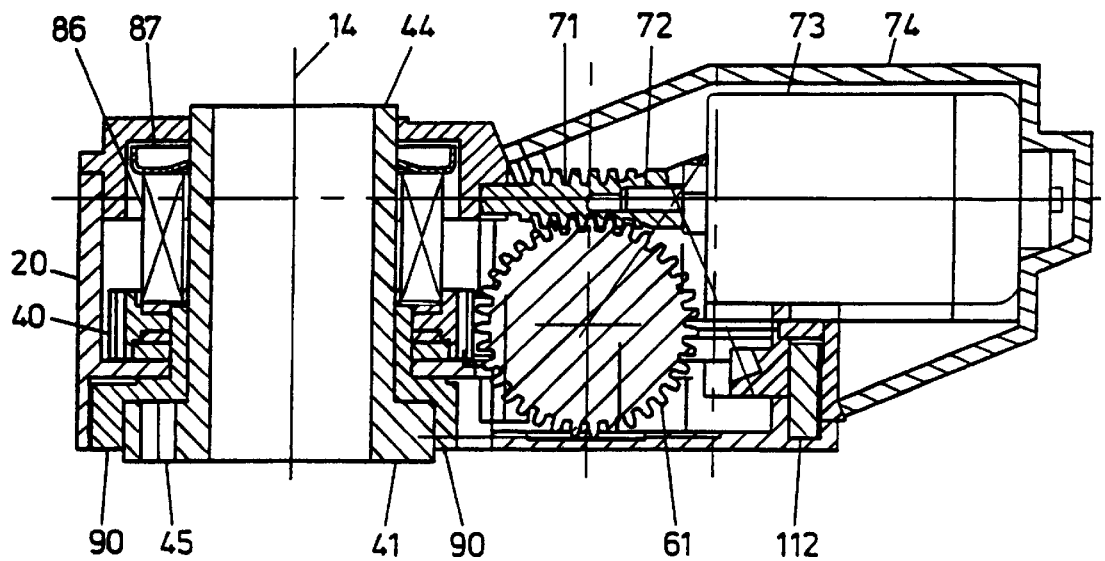
FIG. 5 shows a side elevation, comparable with FIG. 3A, of another embodiment of a movement actuator according to the invention.
Figure 6:
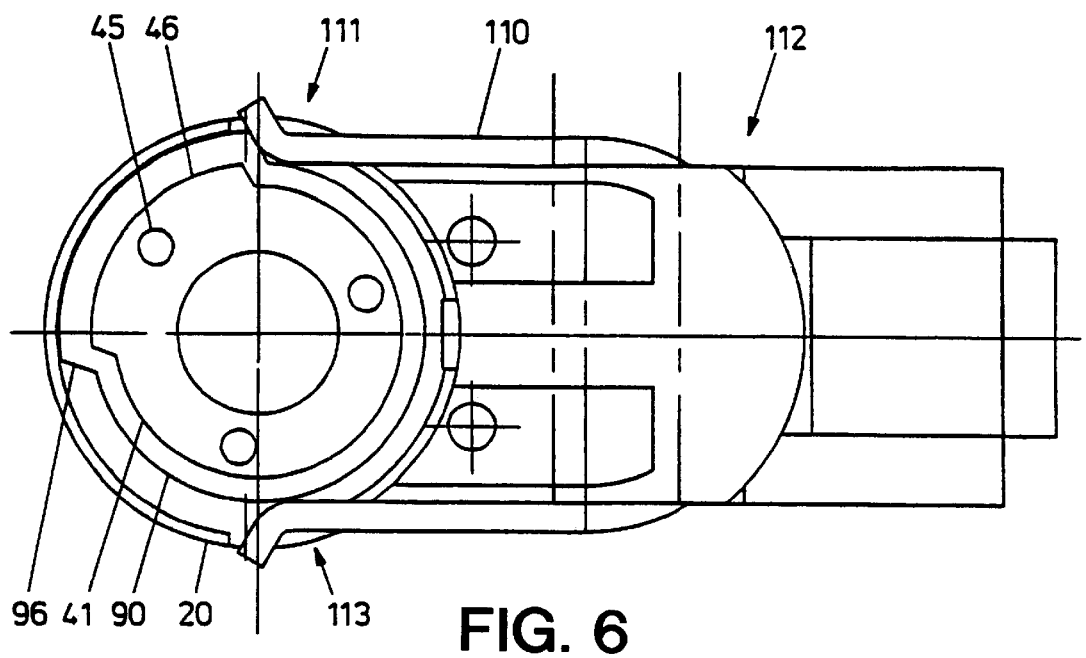
FIG. 6 shows a bottom view of the movement actuator shown in FIG. 5.

Now, reference is made to FIG. 5, showing a section, comparable with FIG. 3A, of another embodiment of the actuator, wherein like or comparable parts as in FIG. 3 have been designated by like reference numerals. Further, reference is made to FIG. 6, showing a bottom view of the actuator shown in FIG. 5. In FIGS. 5 and 6, fastening holes for the base 41 are indicated by the reference numeral 45. Further, by the reference numeral 46, a cam-shaped protuberance is indicated, formed on the base 41. As is clearly shown in FIG. 6, the cam disc 90 has a comparable protuberance 96 which fits around the protuberance 46 of the base 41, providing a securing against rotation of the cam disc 90 relative to the base 41. However, it will be clear that this securing against rotation can also be realized in another manner.

The protuberance 96 of the cam disc 90, hereinafter referred to as a cam, is intended to cooperate with a springy element, in the example shown a first end 111 of a leaf spring 110 whose other end 112 is retained in the housing 20. The first end 111 of the leaf spring 110 rests against the cam disc 90, and the press-on force with which first end 111 presses against the cam disc 90 can be slight. Optionally, it is also possible that first end 111 is clear of the cam disc 90.

The combination of the cam 96 and the springy element 110 serves to define the operational position of the actuator. In the rearwardly folded position of the actuator, the cam 96 is clear of the first leaf spring end 111. When the actuator is moved, manually or electrically, from the rearwardly folded position to the operational position, i.e. the housing 20 rotates counter-clockwise relative to the base 41 in FIG. 6, the first leaf spring end 111 moves along the cam disc 90, with little or no friction being developed. Preferably, the outer circumference of the cam disc 90, at least at the location of the first leaf spring end 111, has the shape of a circular arc.

The rotation position wherein the cam 96 and the first leaf spring end 111 touch each other, which position is shown in FIG. 6, is the operational position. Because the cam 96 and the first leaf spring end 111 resist a further rotation in the direction mentioned, the user, upon adjusting by hand, will experience the same sensation as if the first leaf spring end 111 were a stop for the cam 96, and he will realize that he has reached the operational position. Likewise, in the case of electrical adjustment, the motor 73 cannot rotate the housing 20 and the base 41 any further relative to each other. Because the motor still urges, via the transmission system 60, the gear wheel 40 to rotate relative to the housing 20, while the housing 20, the base 41, the cam disc 90, the fingers 42 and the friction plates 82 and 83 are now stationary relative to each other, the motor 73 should now overcome the maximum friction value of the friction plates 81–84. By the further rotating gear wheel 40, a switch 77 included in the feed circuit for the motor 73 can be operated, in a known manner,—to interrupt the current supply to the motor 73, as a result of which the motor 73 stops. It is observed that this switch 77 does not interrupt the current supply which causes the motor 73 to rotate in the opposite direction, so that it is still possible to pivot electrically from the operational position to the rearwardly folded position.

It will be clear that in this manner, the operational position is always reached in a positive and reproducible manner, no matter whether the adjustment operation takes place manually or electrically.

For a continued pivotal movement, i.e. from the operational position to the forwardly folded position, a threshold force should be exerted sufficient to cause the cam 96 to press the first leaf spring end 111 outward, with the cam 96 sliding along first end 111. Preferably, the first leaf spring end 111 is properly rounded and/or bent outward, as shown in FIG. 6, so as to limit the occurrence of wear as much as possible. The exact magnitude of this threshold force depends on, inter alia, the spring constant of the leaf spring 110, the distance between the first leaf spring end 111 and the second leaf spring end 112, the height of the cam 96, and the angle made by the tangent plane between cam 96 and end 111 with the plane through the rotation axis 14 passing through the tangent point, as will be clear to anyone skilled in the art.

Once the first end 111 has been pressed outward by the cam 96, a further rotation toward the forwardly folded position (defined by fixed stops) requires relatively little force, because this involves the first leaf spring end 111 sliding across the outer surface of the cam 96. Preferably, the outer circumference of the cam 96, at least at the location of the first leaf spring end 111, has the shape of a circular arc.

Likewise, reverse rotation from the forwardly folded position toward the operational position requires relatively little force, so that it can be performed not only manually, but also electrically. The first leaf spring end 111 slides again across the outer surface of the cam 96. When the first leaf spring end 111 passes the cam 96, that first end 111 "jumps" back to the outer surface of the cam disc 90, under the influence of spring action of the leaf spring 110, which the user experiences as a recognizable click indicating the operational position. If this reverse motion is carried out electrically, to enable the operational position to be positively located, this movement can be continued as far as the rearwardly folded position and then followed by the movement from the rearwardly folded position to the operational position as described hereinabove.

Optionally, in the outer surface of the cam disc 90, next to the cam 96, a small recess can be provided wherein the outside bend of the outwardly bent portion of the first leaf spring end 111 extends, to provide in the operational position some mechanical securing against folding in.

For the above-described operation, the presence of a separate cam disc is not necessary. Functionally, the base 41 and the cam disc 90 can be considered a unit, and the definition of the operational position in the above-described manner can indeed already be obtained through the base 41 with the cam 46 formed thereon, which is equivalent to a combination, manufactured in one piece, of base and cam disc. However, the presence of the separate cam disc 90 offers the advantage that in that case, the base 41 and the outer surface of the cam 96, which outer surface contacts the first leaf spring end 111, can be made of different materials. In this connection, for the base 41 a metal, for instance aluminum, can be chosen for reasons of strength, and for the cam disc 90 a synthetic material, for instance PBTP, can be chosen in view of the minimization of the occurrence of friction and wear.

In the embodiment shown, a third leaf spring end 113 is present, symmetrical to the above-mentioned first leaf spring end 111. For that purpose, a second leaf spring can be used, but preferably, and as for instance shown in more detail in FIG. 7, the actuator comprises a U-shaped pinch spring 110, the first and third leaf spring ends being formed by the ends of the legs of the U, and the common second end 112 being formed by the central bend of the U. The U-shaped pinch spring 110 is designed to have its legs exert a pinch force on the base 41 and the cam 96. Such a U-shaped pinch spring 110 is in itself force-closed, so that the clamping point of the U-bend 112 need not take up any spring force in that direction. Accordingly, for positioning the U-shaped pinch spring 110, it is sufficient when the housing 20 comprises a support 27 against which the central bend 112 of the U-shaped pinch spring 110 abuts.

Figure 7:
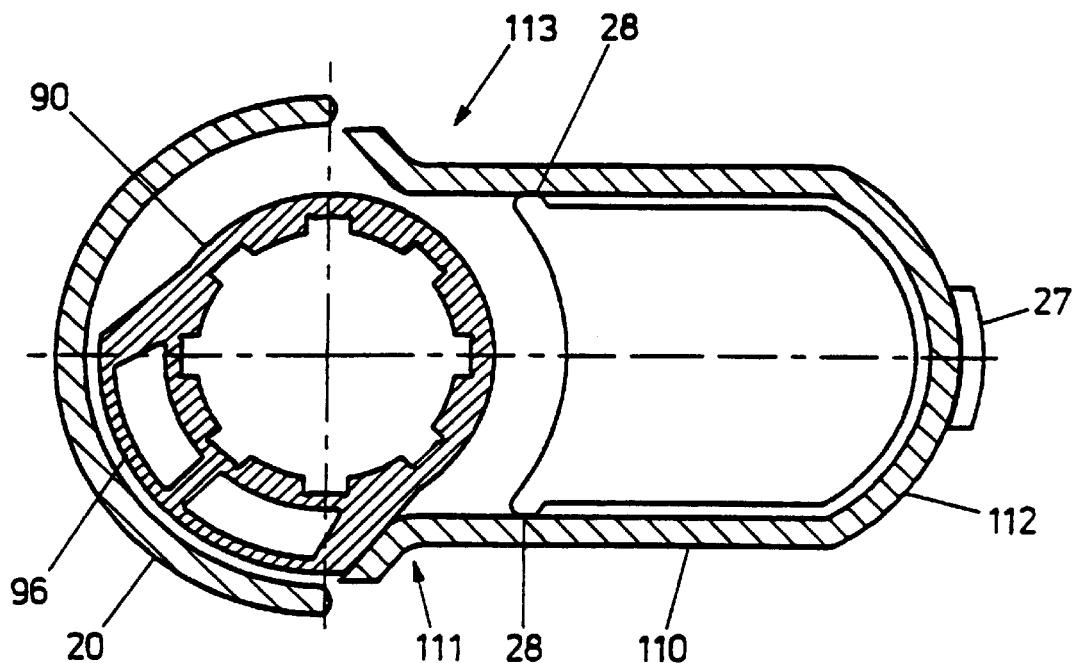
FIG. 7 shows a detail of a movement actuator.

FIG. 7 further shows that in rotation positions between the operational position and the rearwardly folded position the leaf spring ends 111 and 113 can be clear of the cam disc 90. For this purpose, the housing 20 of the embodiment shown comprises two further supports 28, arranged next to the legs of the U. Preferably, the spring 110 is arranged with a fairly great pre-tension ("pinching"), which pinching pre-tension is taken up by these supports 28 in the structural variant shown in FIG. 7. This provides the advantage that the cam 96, when contacting the first leaf spring end 111, cannot rotate any further until the function of the support 28 has been taken over by the cam 96, i.e. the cam 96 takes up the entire pinching pre-compression of the spring 110. The friction coupling 80 will not be capable of supplying this force, as a result of which the rotating movement of the cam 96 relative to the first leaf spring end 111 stops at the first contact between cam 96 and end 111, regardless of the precise friction value of the friction coupling 80, which ensures a particularly accurate setting of the operational position.

A further advantage of the construction shown concerns the fact that the actuator can have a symmetrical operation, permitting the same actuator to be used for a left mirror as well as for a right mirror. In the embodiment discussed, when used in a left mirror, the operational position is defined by the cooperation of the cam 96 with the first leaf spring end 111, while when used in a right mirror, the operational position is defined by the cooperation of the cam 96 with the third leaf spring end 113. This yields a further cost saving, because it is sufficient for a manufacturer to produce only one type.

Figure 8:
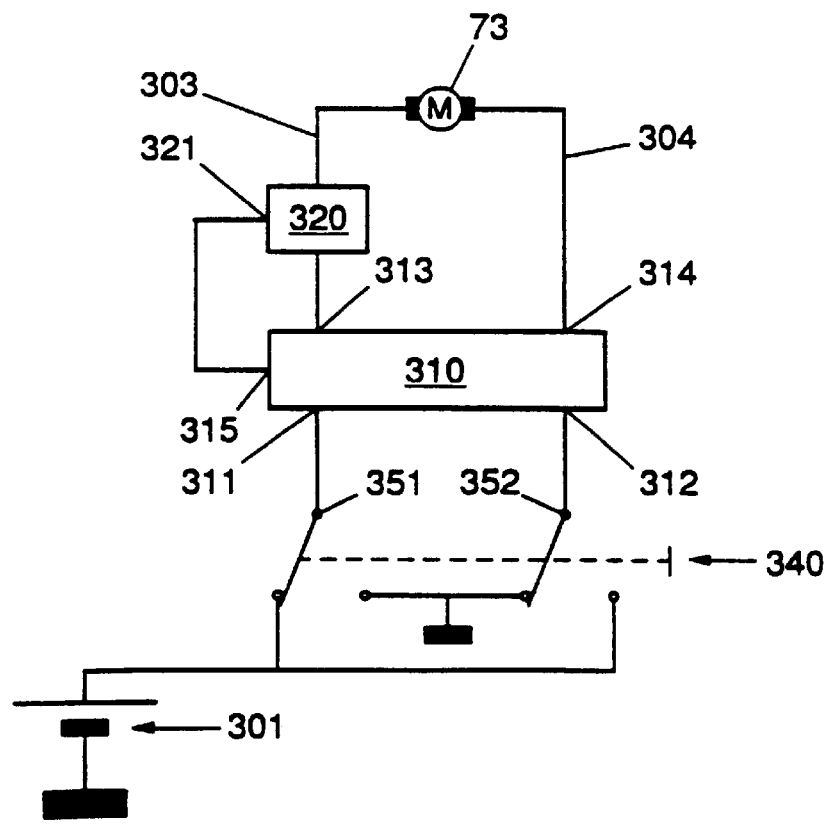
FIG. 8 a shows a wiring diagram for a movement actuator according to the invention.

A still further saving in space and parts can be realized by omitting the switches 77. In order to determine when the motor 73 should be switched off because the operational position or the rearwardly folded position has been reached, the actuator according to the invention, in a preferred embodiment, has a control element 310 for the motor 73, and a detector 320 for current and/or voltage, as illustrated in FIG. 8. FIG. 8 further shows a voltage source 301, in general a battery, and a switch 340 to be operated by the user. Make-and-break contacts 351, 352 of the switch 340 are connected with a first input 311 and a second input 312 respectively of the control element 310. In one position (shown) of the switch 340, the make-and-break contact 351 is connected with the supply voltage and the make-and-break contact 351 is connected with mass. In the discussion hereinbelow, it will be assumed that this position of the switch 340 corresponds to the operational position of the operating actuator. In the other position of the switch 340, the make-and-break contact 351 is connected with mass and the make-and-break contact 352 is connected with the supply voltage.

Suppose that the operating actuator is in the rearwardly folded position, and that the switch 340 is switched in this one position by the user. The control element 310 will then connect the first input 311 with a first output 313, and connects the second input 312 with a second output 314. Thus, the current through the motor 73 flows from the conductor 303 to the conductor 304, and the rotation of the motor 73, caused thereby, takes place in a direction corresponding to a pivotal movement from the rearwardly folded position to the operational position.

Included in the conductor 303 to the motor 73 is load detector 320. In a simple embodiment, this load detector 220 consists of a current detector. An output 321 of the load detector 320 is connected with a detection input 315 of the control element 310. The control element 310 is adapted to monitor signals supplied by the load detector 320, and to interrupt the connection of the first input 311 with the first output 313 and/or the connection of the second input 312 with the second output 314 and thus switch off the motor 73 when the received signals are indicative of a load increase. In this simple embodiment, such a signal indicative of the load increase is formed by the increase of the current intensity measured.

The load increase is caused by an opposition that is experienced when the actuator is pivoted further. This opposition is for instance caused when the rearwardly folded position defined by the stops is reached, or when the cam 96 presses against an end 111, 113 of the leaf spring 110.

When the user switches the switch 340 into another position, the control device 310 detects a voltage reversal at its inputs 311, 312. In response thereto, the control device 310 re-establishes the above-mentioned connection between the inputs 311, 312 and the above-mentioned outputs 313, 314, causing the motor 73 to rotate in an opposite direction so as to bring the movement actuator into the rearwardly folded position.

This embodiment offers the additional advantage that the motor 73 is also stopped when the pivotal movement is blocked by any other cause, which hence means an extra security against the occurrence of damage.

By way of example, the control device can be adapted to compare the received signals with previously input threshold values, and to interrupt the above-mentioned connections when one or several of the received signals exceeds or falls below the associated threshold value. In this respect, it may be advantageous if there is a slight time delay between the time of detection and the time of switching off.

Further, in a particular structural variant, a temperature detector (not shown) is present, disposed in the proximity of the motor 73 to detect heating up of the motor and to provide to the control device 310 a signal indicative of the temperature of the motor 73, permitting the control device 310 to switch off the motor 73 also if it should become overheated by whatever cause.

Because the load detector 320 detects electric signals, it need not be mounted in the direct proximity of the pivoting mechanism. In a particular embodiment, the load detector 320 and the control device 310 can even be accommodated in the interior of the associated vehicle. It is thus provided that the actuator itself need not have any elements relating to the switching-off operation of the motor 73, and can hence have the slightest possible dimensions.

However, the provision of a control device 310 with associated load detector 320 for each separate motor offers practical advantages, because it will then be easier to adapt the control device 310 with associated load detector 320 to the specific characteristic of a particular motor. Further, it will then be easier to have the control device 310 react to temperature changes of that motor.

It will be readily understood by anyone skilled in the art that it is possible to change or modify the illustrated embodiment of the apparatus according to the invention without departing from the inventive concept or protective scope. For instance, it is possible that the cam is associated with the housing 20 and that the springy element is accociated with the base 41.

Further, it is possible that the load detector 320 is not a separate component, but is a part of the control device 310, which can for instance be constructed as an integrated circuit. The above-mentioned temperature detector can be part of that integrated circuit as well.

I claim:

1. A movement actuator comprising:
   a first module including:
      first and second actuator parts mounted for rotation relative to one another;
      a gear wheel rotatably arranged in said second actuator part; and
      a transmission system including a coupler coupled to said gear wheel, and a worm wheel;
   a second module including:
      a motor housing; and
      an electromotor mounted in said housing, said electromotor including a drive shaft having mounted thereon a worm; and
   said first module and said second module being constructed to fit together in different manners of fixed orientation of said motor housing and said electromotor relative to said second actuator part in each of which said worm engages said worm wheel, thereby coupling said electromotor through said transmission system and said gear wheel to said actuator parts, such that said electromotor is operable to rotate said actuator parts relative to each other.

2. A movement actuator as claimed in claim 1, further comprising a friction coupling which couples said gear wheel to said first actuator part, said friction coupling including at least an annular plate associated with said gear wheel and at least an annular friction plate associated with said first actuator part.

3. A movement actuator as claimed in claim 2, wherein said friction coupling further includes a part associated with said gear wheel and that rests against an annular supporting wall of said second actuator part, and further comprising a compression spring acting between said first actuator part and said friction coupling to compress said friction coupling.

4. A movement actuator as claimed in claim 3, wherein said first actuator part includes a hollow cylinder, and further comprising a check spring pressed against said hollow cylinder by and end of said compression spring opposite said friction coupling.

5. A movement actuator as claimed in claim 4, wherein said compression spring comprises a helical spring coaxially disposed around said hollow cylinder.

6. A movement actuator as claimed in claim 3, wherein said compression spring presses said annular supporting wall against said first actuator part.

7. A movement actuator as claimed in claim 3, further comprising a cam disc arranged between said annular supporting wall and said first actuator part, said cam disc being secured against rotation relative to said first actuator part.

8. A movement actuator as claimed in claim 7, further comprising a cam-shaped protuberance defining a cam and formed on one of said first actuator part and said cam disc.

9. A movement actuator as claimed in claim 8, further comprising a spring element associated with said second actuator part and cooperable with said cam to define an operational position.

10. A movement actuator as claimed in claim 8, wherein, at least in the area of said spring element, said cam has an outer circumference in the shape of a circular arc.

11. A movement actuator as claimed in claim 9, wherein said spring element comprises a leaf spring having a first end cooperating with said cam and a second end retained in said second actuator part.

12. A movement actuator as claimed in claim 11, wherein said leaf spring includes a third end symmetrical to said first end and cooperating with said cam to define an operational position.

13. A movement actuator as claimed in claim 12, wherein said leaf spring is U-shaped including legs joined by a central bend, said first and third ends are formed by ends of said legs and are loaded for bending outwardly only, and said second end is formed by said central bend.

14. A movement actuator as claimed in claim 1, wherein said transmission system further includes worms on opposite sides of said worm wheel, said coupler comprises intermediate gear wheels engaged with respective said worms and with said gear wheel, and further comprising switches operable by said gear wheel for switching off said electromotor, said switches being positioned within said second actuator part above said worms and said intermediate gear wheels.

15. A movement actuator as claimed in claim 1, further comprising a control device for controlling said electromotor, and a load detector coupled to an input of said control device and included in a supply line of said electromotor, said control device being operable to interrupt, in response to detection by said load detector of a load increase, a connection from a supply source to said electromotor and to remove such interruption only when said control device detects a polarity reversal at an input thereof.

16. A movement actuator as claimed in claim 15, further comprising a temperature detector coupled to said control device and disposed in the proximity of said electromotor.

17. A wing mirror system for a vehicle, said system comprising a mirror housing, a rear view mirror disposed in said mirror housing, and a movement actuator as claimed in claim 1 arranged in said mirror housing.

18. A wing mirror system as claimed in claim 17, further comprising a control device for controlling said electromotor, and a load detector coupled to an input of said control device and included in a supply line of said electromotor, said control device and said load detector being arranged in said mirror housing.

* * * * *